US008670447B2

(12) United States Patent
Hu et al.

(10) Patent No.: US 8,670,447 B2
(45) Date of Patent: Mar. 11, 2014

(54) METHOD AND EQUIPMENT FOR DETERMINING THE TRANSMISSION RESOURCE OF CHANNEL QUALITY INDICATOR

(75) Inventors: Zhenping Hu, Beijing (CN); Xiaodong Xu, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 365 days.

(21) Appl. No.: 12/989,893

(22) PCT Filed: Apr. 29, 2009

(86) PCT No.: PCT/CN2009/000476
§ 371 (c)(1),
(2), (4) Date: Oct. 27, 2010

(87) PCT Pub. No.: WO2009/132523
PCT Pub. Date: Nov. 5, 2009

(65) Prior Publication Data
US 2011/0038277 A1 Feb. 17, 2011

(30) Foreign Application Priority Data
Apr. 29, 2008 (CN) .......................... 2008 1 0105422

(51) Int. Cl.
*H04L 12/28* (2006.01)
(52) U.S. Cl.
USPC ............................ 370/392; 370/252; 370/311
(58) Field of Classification Search
USPC ................................................ 370/252, 311
See application file for complete search history.

(56) References Cited

U.S. PATENT DOCUMENTS

| 7,660,601 | B2* | 2/2010 | Janik et al. ................. 455/556.1 |
| 8,121,045 | B2* | 2/2012 | Cai et al. ......................... 370/252 |
| 2012/0026873 | A1* | 2/2012 | Spinar et al. .................. 370/230 |
| 2012/0294207 | A1* | 11/2012 | Ahn et al. ..................... 370/280 |

FOREIGN PATENT DOCUMENTS

| CN | 1871792 A | 11/2006 |
| CN | 101132201 A | 2/2008 |
| WO | WO2007/123346 A1 | 11/2007 |

OTHER PUBLICATIONS

CQI and SRS transmission during DRX in TDD, CATT, Mar. 31, 2008.*
International Search Report of PCT/CN2009/000476 Dated Aug. 6, 2009 With English Translation.

* cited by examiner

*Primary Examiner* — Hassan Kizou
*Assistant Examiner* — Abdullahi Ahmed
(74) *Attorney, Agent, or Firm* — Workman Nydegger (57) ABSTRACT

A method and equipment for determining the transmission resource of channel quality indicator are disclosed. They are applied in Time Division Duplex TDD system and Half Duplex-Frequency Division Duplex HD-FDD system when Discontinuous Reception DRX operation is adopted. The method includes the following steps: determining the location of the downlink subframe where the start point of monitoring Physical Downlink Control Channel PDCCH in DRX cycle is located; determining whether the transmission resource used for transmitting the Channel Quality Indicator CQI is an uplink subframe previous to the determined location or one or more uplink subframes after the determined location. Availability of the CQI information when performing downlink schedule is guaranteed, and the transmission resource used for transmitting CQI can be effectively saved.

13 Claims, 6 Drawing Sheets

METHOD AND EQUIPMENT FOR DETERMINING THE TRANSMISSION RESOURCE OF CHANNEL QUALITY INDICATOR

CROSS REFERENCE TO RELATED APPLICATIONS

The present application is a US National Stage of International Application No. PCT/CN2009/000476, filed 29 Apr. 2009, designating the United States, and claiming priority to Chinese Patent Application No. 200810105422.X filed 29 Apr. 2008.

FIELD OF THE INVENTION

The present invention relates to radio Time Division Duplex (TDD) and Half Duplex-Frequency Division Duplex (HD-FDD) systems and particularly to a method and device for determining a transmission resource of a Channel Quality Indicator (CQI) in a Discontinuous Reception (DRX) operation.

BACKGROUND OF THE INVENTION

In an Evolved Universal Terrestrial Radio Access Network (E-UTRAN) system, a User Equipment (UE) may perform a DRX operation, that is, turning off temporarily the receiver of the UE to save battery power of the UE, and waking up at the time predefined by the Node B to monitor a corresponding Physical layer Downlink Control Channel (PDCCH) so as to know whether there is data to be transmitted to the UE from the Node B. There are some parameters provided for the DRX operation, such as a DRX cycle and some control timers such as an on duration timer and a DRX inactivity timer. The DRX cycle includes a period of active time and a period of inactivity. The UE monitors the PDCCH in an on duration period, and if no downlink data transmission is indicated to the UE from the Node B, the UE enters into the period of inactivity after the expiration of the on duration timer; and if new downlink data transmission is indicated to the UE over the PDCCH during the on duration period, then the DRX inactivity timer starts, and if a period for which no new downlink data transmission is further indicated to the UE over the PDCCH lasts after the expiration of the DRX inactivity timer, then the UE enters into the inactivity status.

In the DRX operation, starting from monitoring the PDCCH in a DRX cycle, the receiver of the UE is turned on to enter into the active status. The E-UTRAN Node B (eNB) may transmit downlink data when the UE is monitoring the PDCCH. Due to the dynamic scheduling adopted in the E-UTRAN system, the Node B needs to know the status of downlink channel from a feedback of the UE, e.g. a CQI of the downlink channel, for downlink transmission. Periodical and non-periodical CQI report mechanisms are supported in the E-UTRAN system. The 3GPP has agreed on how to transmit CQI and SRS information in a DRX cycle for the E-UTRAN FDD system, that is, the CQI information could be transmitted from the UE in the active time of the DRX cycle. However, there is no agreed solution on the way to transmit the CQI and SRS information for the E-UTRAN TDD and HD-FDD systems.

In the TDD system, uplink and downlink transmissions are performed at the same frequency and staggered in time. In the HD-FDD system, uplink and downlink transmissions are performed respectively at different frequencies, but merely one of the uplink and downlink transmissions is performed at any time, which is similar to the TDD system.

Figure 1:
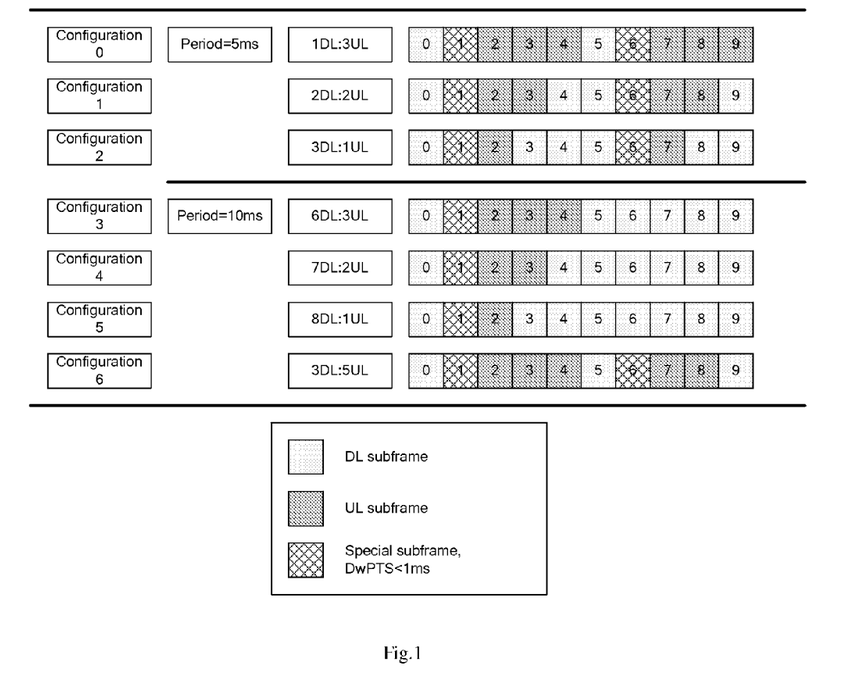
FIG. 1 is a schematic diagram of modes of downlink and uplink sub-frame configuration in a radio frame in an existing E-UTRAN TDD system.

In the existing E-UTRAN TDD system, there are seven modes of downlink and uplink sub-frame configuration in a radio frame as illustrated in FIG. 1, including:

a first configuration mode (Configuration 0): the proportion of downlink sub-frames (DL) to uplink sub-frames (UL) is 1DL:3UL with a periodicity of 5 ms, i.e., periodicity=5 ms;

a second configuration mode (Configuration 1): the proportion of downlink sub-frames (DL) to uplink sub-frames (UL) is 2DL:2UL with a periodicity of 5 ms, i.e., periodicity=5 ms;

a third configuration mode (Configuration 2): the proportion of downlink sub-frames (DL) to uplink sub-frames (UL) is 3DL:1UL with a periodicity of 5 ms, i.e., periodicity=5 ms;

a fourth configuration mode (Configuration 3): the proportion of downlink sub-frames (DL) to uplink sub-frames (UL) is 6DL:3UL with a periodicity of 10 ms, i.e., periodicity=10 ms;

a fifth configuration mode (Configuration 4): the proportion of downlink sub-frames (DL) to uplink sub-frames (UL) is 7DL:2UL with a periodicity of 10 ms, i.e., periodicity=10MS;

a sixth configuration mode (Configuration 5): the proportion of downlink sub-frames (DL) to uplink sub-frames (UL) is 8DL:1UL with a periodicity of 10 ms, i.e., periodicity=10 ms; and a seventh configuration mode (Configuration 6): the proportion of downlink sub-frames (DL) to uplink sub-frames (UL) is 3DL:5UL with a periodicity of 10 ms, i.e., periodicity=10 ms.

In the prior art, the following two methods for reporting a CQI have been proposed for using the DRX operation in the TDD system.

Figure 2:
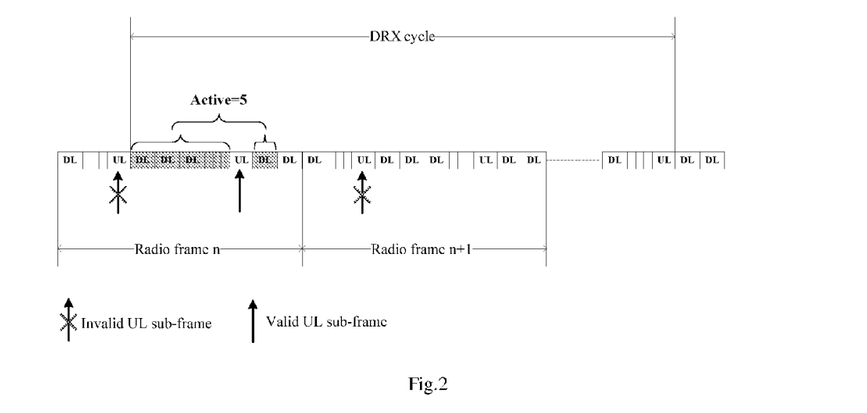
FIG. 2 is a schematic diagram of transmission of a CQI report in an uplink sub-frame interposed between downlink sub-frames in an active time period in the prior art.

In the first method, a CQI report is transmitted in the uplink sub-frame(s) in-between downlink sub-frames in the active time period. As illustrated in FIG. 2, it is assumed that there are five downlink sub-frames in the active time period, i.e., Active time=5, then a CQI is reported in the UL sub-frame in-between DL sub-frames in the active time period. In FIG. 2, the UL sub-frame to which a vertical and upward arrow without a cross mark points is the corresponding UL sub-frame used for reporting the CQI, and the UL sub-frame to which a vertical and upward arrow with a cross mark points is not intended for transmission of any CQI report.

Figure 3:
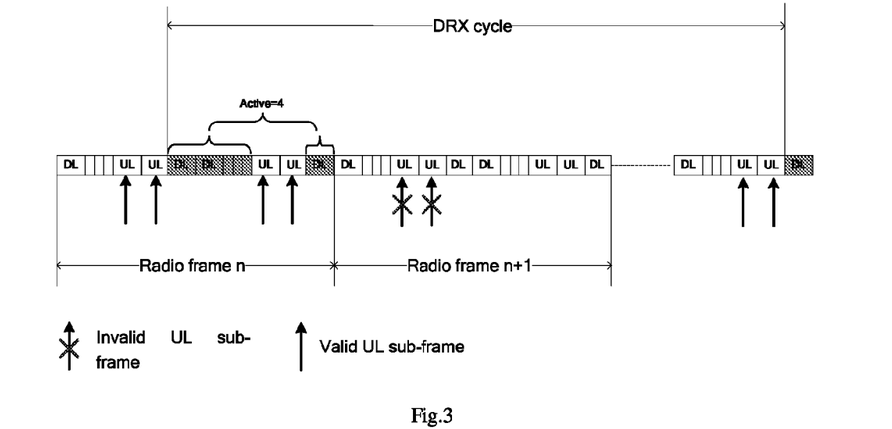
FIG. 3 is a schematic diagram of possible transmission of a CQI report in each of uplink sub-frames of a radio frame which an active time period spans in the prior art.
Figure 4:
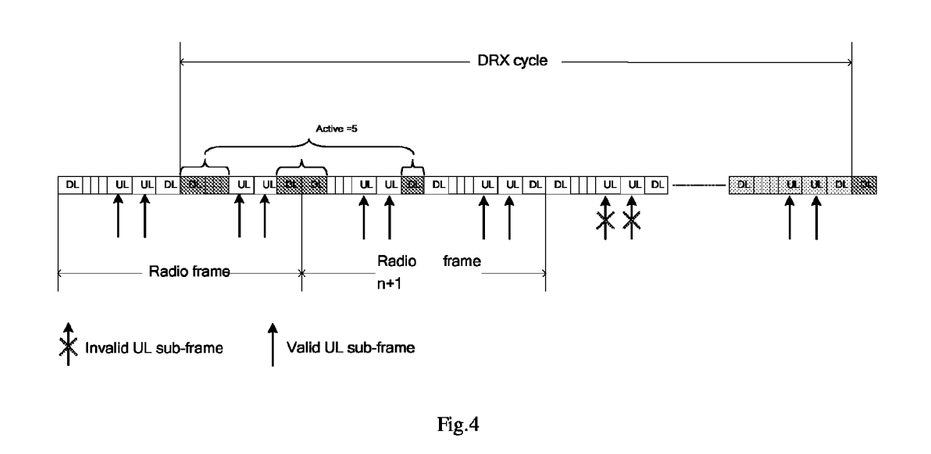
FIG. 4 is another schematic diagram of possible transmission of a CQI report in each of uplink sub-frames of a radio frame which an active time period spans in the prior art.

In the second method, a CQI report is transmitted in each of uplink sub-frames of a radio frame(s) which the active time period spans, as illustrated in FIGS. 3 and 4. In FIG. 3, the active time period is in the $n^{th}$ radio frame, and then a CQI report is transmitted in each of uplink sub-frames of the $n^{th}$ radio frame (four UL sub-frames are denoted in FIG. 3). In FIG. 4, the active time period spans the $n^{th}$ and $(n+1)^{th}$ radio frames, and then a CQI report is transmitted in each of uplink sub-frames of the $n^{th}$ radio frame (four UL sub-frames are denoted in FIG. 4) and of uplink sub-frames of the $(n+1)^{th}$ radio frame (four UL sub-frames are denoted in FIG. 4).

The above two methods in the prior art present their own disadvantages.

In the first method, inclusion of an uplink sub-frame in the active time period can not be ensured, and consequently it is possible that no CQI report can be transmitted at all.

In the second method, on one hand, it might be possible that a CQI report is transmitted in an uplink when the active time period ends and the receiver of the UE has reentered into the inactivity status. However, since no downlink transmission has been indicated at this time, the subsequently transmitted CQI is useless, and transmission of the CQI in this case is a waste of uplink resources; and on the other hand, in order to know uplink sub-frames available for transmission of a CQI, an upper layer allocating transmission resources for the CQI has to know the number and boundaries of radio frames which the active time period spans, which also increases the complexity and uncertainty.

SUMMARY OF THE INVENTION

An embodiment of the invention provides a method for determining a transmission resource of a CQI which can ensure availability of CQI information in downlink scheduling and save the uplink resource effectively.

An embodiment of the invention further provides a device for determining a transmission resource of a CQI which can ensure availability of CQI information in downlink scheduling and save an uplink resource effectively.

A method for determining the transmission resource for the CQI reporting according to an embodiment of the invention, applicable to a DRX operation in a TDD system and an HD-FDD system, includes:

determining a position of a downlink sub-frame where monitoring of a PDCCH is started in a DRX cycle; and determining a transmission resource for transmitting a CQI as:

one uplink sub-frame preceding the determined position; or one or more uplink sub-frames following the determined position.

A device for determining a transmission resource of a CQI according to an embodiment of the invention, applicable to a DRX operation in a TDD system, and an HD-FDD system, includes:

a first determination unit configured to determine a position of a downlink sub-frame where monitoring of a PDCCH is started in a DRX cycle; and a second determination unit configured to determine a transmission resource for transmitting a CQI as: one uplink sub-frame preceding the determined position; or one or more uplink sub-frames following the determined position.

With the solutions of determining a transmission resource of a CQI according to the embodiments of the invention, the position of a downlink sub-frame where monitoring of a PDCCH is started in a DRX cycle is determined, to thereby determine a transmission resource of a CQI as one uplink sub-frame preceding the determined position or one or more uplink sub-frames following the determined position. With the foregoing solutions, one of the uplink sub-frames preceding the position of the downlink sub-frame where monitoring of a PDCCH is started in the DRX cycle or one or more of the uplink sub-frames following the position of the downlink sub-frame where monitoring of a PDCCH is started in the DRX cycle can be allocated for transmission of the CQI dependent upon a practical situation, to thereby effectively support a downlink scheduling operation and save an uplink resource required to be reserved for periodical transmission of the CQI.

DETAILED DESCRIPTION OF THE EMBODIMENTS

The method and device according to the invention will be described in detail below in connection with embodiments and drawings.

A First Embodiment

Figure 5:
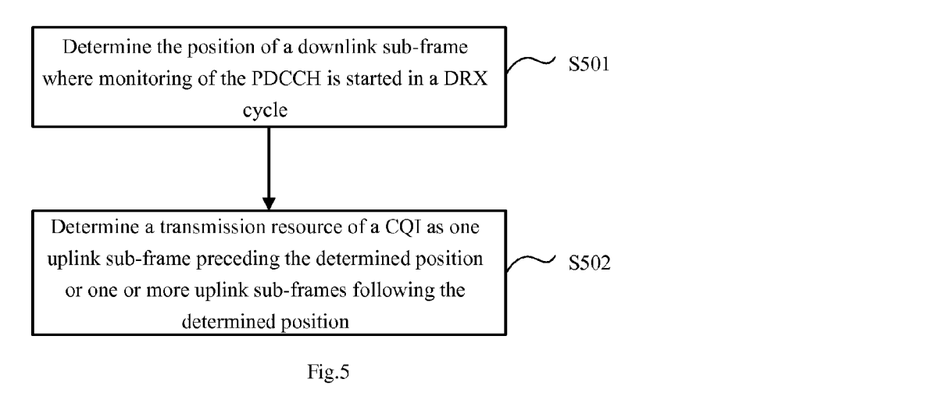
FIG. 5 is a flow chart of a method for determining a transmission resource of a CQI according to a first embodiment of the invention.

Reference is made to FIG. 5 illustrating a flow chart of a method for determining a transmission resource of a CQI according to the first embodiment of the invention, which includes the following operations S501-S502.

At operation S501, a position of a downlink sub-frame, where the starting point of monitoring a PDCCH in a DRX cycle is located, is determined;

That is, the position of a first downlink sub-frame, where the monitoring of the PDCCH is started in the DRX cycle, is determined At operation S502, a transmission resource of a CQI is determined as:

one uplink sub-frame preceding the determined position; or one or more uplink sub-frames following the determined position.

Preferably, determining the transmission resource of the CQI in the operation S502 particularly includes:

determining a queue in which uplink and downlink sub-frames are ordered in a preset period after activation of a receiver of a UE according to the determined position and a configured mode of downlink and uplink sub-frame configuration in a radio frame in a TDD system; and determining the transmission resource for transmitting the CQI based upon the queue.

Preferably, determining the transmission resource for transmitting the CQI based upon the queue particularly includes:

determining one or more of the uplink sub-frames in the queue as the transmission resource for the periodical or non-periodical transmission of the CQI.

The operations of the method according to the first embodiment will be detailed below in connection with different modes of downlink and uplink sub-frame configuration in a radio frame in the TDD system.

In a first scenario with regarding to the configuration modes in which the uplink and downlink sub-frames are configured in proportion of 1DL:3UL and 3DL:5UL as illustrated in FIG. 1, the number of uplink sub-frames is larger than that of downlink sub-frames; even if special sub-frames are taken into account, the consecutive downlink sub-frames last three Transmission Time Intervals (TTI) at most; and a larger number of uplink sub-frames are interposed between the downlink sub-frames. If it is indicated at the beginning of a DRX cycle that there is downlink data for transmission (that is, CQI information is required to be fed back for use), then uplink sub-frames is almost necessarily included in a span of the downlink sub-frames included in the minimum active time period, and appropriate one(s) of the uplink sub-frames can be selected for transmission of the CQI information to support effectively a downlink scheduling operation, and in this case, no periodical uplink resource for transmission of the CQI is required to be configured prior to monitoring of the PDCCH, thus saving an uplink resource required to be reserved for periodical transmission of the CQI.

Figure 6:
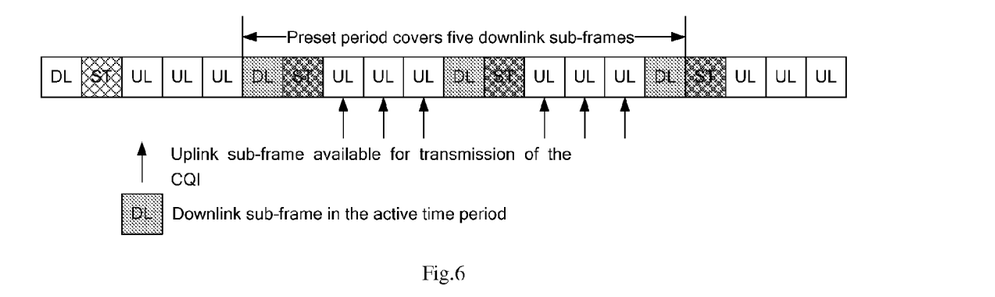
FIG. 6 is a schematic diagram of transmission of a CQI without configuring an uplink resource preceding a starting point of monitoring a PDCCH according to the embodiment of the invention.

Referring to FIG. 6 illustrating a configuration mode in which uplink and downlink sub-frames are configured in proportion of 1DL:3UL, it is assumed that a UE enters into an active time period from the left, vertical, long and black line drawn in FIG. 6, the starting point of monitoring the PDCCH is the position of the first DL sub-frame on the right side of the black line, and a preset period covers five downlink sub-frames, then starting from the position of the sub-frame where the starting point of monitoring the PDCCH is located, it is determined from the order in which uplink and downlink sub-frames are arranged in the configuration mode of 1DL:3UL and the length of the preset period that a queue in which uplink and downlink sub-frames are ordered in the preset period after activation of the UE includes all of the DL and UL sub-frames between the two long and black lines in FIG. 6. As can be apparent from FIG. 6, this queue includes six UL sub-frames, all of which can theoretically be taken as uplink sub-frames for transmission of the CQI.

In view of a transmission delay of reporting the CQI and a delay caused by the processing of the received CQI report at the network side, in the case that there are a plurality of uplink sub-frames in the queue, according to the transmission delay of reporting the CQI plus the processing delay of the CQI report of T, one of the consecutive uplink sub-frames in the queue leading in the period of T preceding the position of the next downlink sub-frame is selected as transmission resources for the periodical or non-periodical transmission of the CQI. Assuming T=3 ms (i.e., a delay of three sub-frames) and in order to ensure timely reception and processing of the CQI report at the network side and make the reported CQI reflect as truly as possible the current channel quality of the downlink channel, the leftmost UL sub-frame (the sub-frames are arranged in time from left to right) can be selected as the transmission resource for the periodical or non-periodical transmission of the CQI in the scenario illustrated in FIG. 6.

The number of downlink sub-frames included in the foregoing preset period may be determined from the number of downlink sub-frames which the on duration period spans and a cycle of repeating the arranged sub-frames corresponding to the currently configured mode of downlink and uplink sub-frame configuration in a radio frame in the TDD system. Here, the number of downlink sub-frames which the on duration period spans is the number of downlink sub-frames where the PDCCH is monitored continuously in the start phase (i.e., the on duration phase) of a DRX cycle preset by a Node B.

In FIG. 6, the configuration mode in which uplink and downlink sub-frames are configured in proportion of 1DL:3UL is adopted with a corresponding cycle 5 of repeating the arranged sub-frames, and then the preset period may be set to cover five downlink sub-frames.

In a second scenario with regarding to the configuration mode in which the uplink and downlink sub-frames are configured in proportion of 7DL:2UL as illustrated in FIG. 1, although the number of downlink sub-frames is much larger than that of uplink sub-frames and there are a large number of consecutive downlink sub-frames, no uplink resource for transmission of the CQI is required to be configured prior to monitoring of the PDCCH in the method according to the first embodiment if the position of the sub-frame where the starting point of monitoring the PDCCH is located is the position where the radio frame begins and the on duration period is longer.

Figure 7:
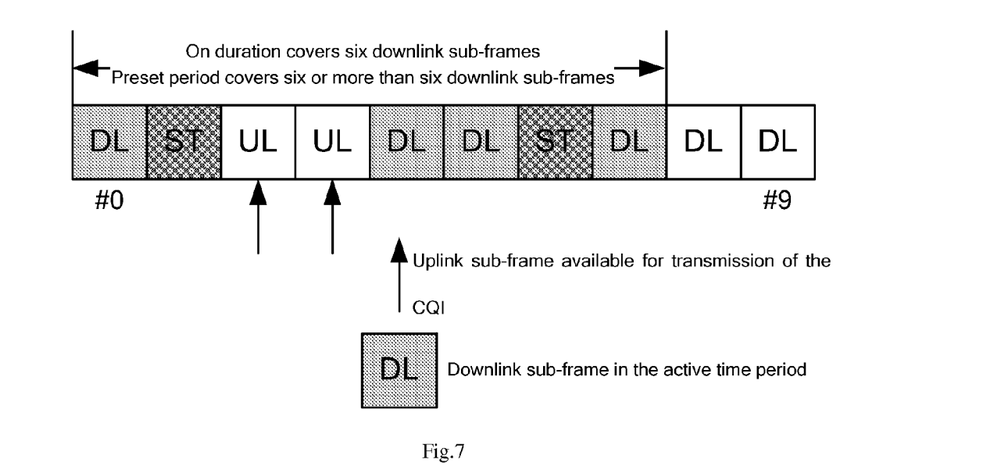
FIG. 7 is another schematic diagram of transmission of a CQI without configuring an uplink resource preceding a starting point of monitoring a PDCCH according to the embodiment of the invention.

As illustrated in FIG. 7, assuming the on duration period covers six downlink sub-frames, the preset period covers six or more downlink sub-frames (taking six downlink sub-frames as an example), and the position of the sub-frame where the starting point of monitoring the PDCCH is located is the first sub-frame (#0) of the radio frame, then starting from the position of the sub-frame where the starting point of monitoring the PDCCH is located, it is determined, from the order in which uplink and downlink sub-frames are arranged in the configuration mode of 7DL:2UL and the length of the preset period, that a queue in which uplink and downlink sub-frames are ordered in the preset period after activation of the UE includes all of the DL and UL sub-frames between the two long and black lines in FIG. 7. As can be apparent from FIG. 7, this queue includes two UL sub-frames, both of which can theoretically be taken as uplink sub-frames for transmission of the CQI. In view of a transmission delay of reporting the CQI and a delay caused by the processing of the received CQI report at the network side, the leftmost UL sub-frame can be selected as the transmission resources for the periodical or non-periodical transmission of the CQI in order to ensure as early reception as possible of the CQI report at the network side for downlink scheduling.

In a third scenario, the position of the sub-frame where the starting point of monitoring the PDCCH is located may not necessarily be the position where a radio frame begins. In some modes of downlink and uplink sub-frame configuration in a radio frame in the TDD system, there is a UL sub-frame in the queue available for transmission of the CQI in the method for determining a transmission resource of a CQI according to the first embodiment of the invention, however, since there may be a plurality of DL sub-frames in the active time period preceding the UL sub-frame, and no CQI was received at the network side preceding the active time period, effective resource scheduling can not be performed on the plurality of DL sub-frames, thus degrading the efficiency of downlink transmission. To this end, an embodiment of the invention provides the following further improved solution.

Based upon the foregoing solution, it is further determined whether the number of downlink sub-frames arranged preceding the uplink sub-frame leading in the queue reaches a preset threshold, and if so, then one of the uplink sub-frames preceding the position of the sub-frame where the starting point of monitoring the PDCCH is located is also determined as the periodical transmission resource of the CQI.

This improved solution ensures that there is CQI information transmitted over uplink resource in the active time period of the UE.

Figure 8:
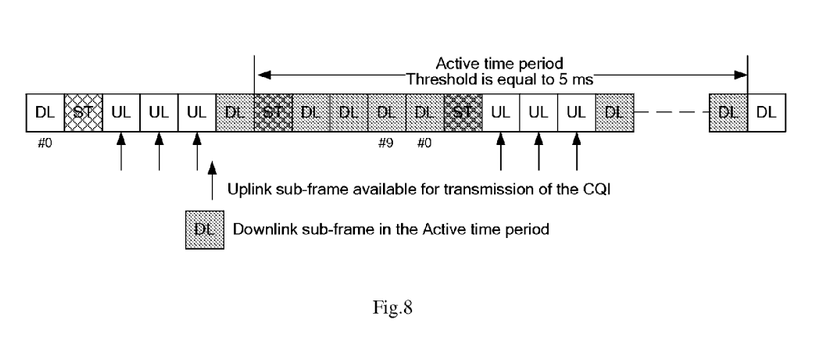
FIG. 8 is a schematic diagram of transmission of a CQI with configuring an uplink resource preceding a starting point of monitoring a PDCCH according to the embodiment of the invention.

Reference is made to FIG. 8 for a specific instance of the third scenario, assuming the preset threshold is set as five consecutive downlink sub-frames (5 ms), then in the configuration mode of 6DL:3UL, if the starting point of monitoring the PDCCH is the sub-frame #6, then the first succeeding uplink sub-frame is the sub-frame #2 of the next radio frame, and there are six consecutive downlink sub-frames preceding the sub-frame #2, which exceeds the threshold. In this case, the CQI information shall be transmitted preceding the starting point of monitoring the PDCCH, e.g., in the uplink sub-frame #3 of the present radio frame, in order to ensure dynamic scheduling of these downlink sub-frames using downlink channel information carried in the reported CQI.

The method according to the first embodiment is applicable to a scenario where a UL sub-frame is included in the queue. In practice, absence of UL in the queue is also possible in the method according to the first embodiment, thus a second embodiment of the invention proposes a method for determining a transmission resource of a CQI encompassing both presence and absence of a UL in the queue.

A Second Embodiment

Figure 9:
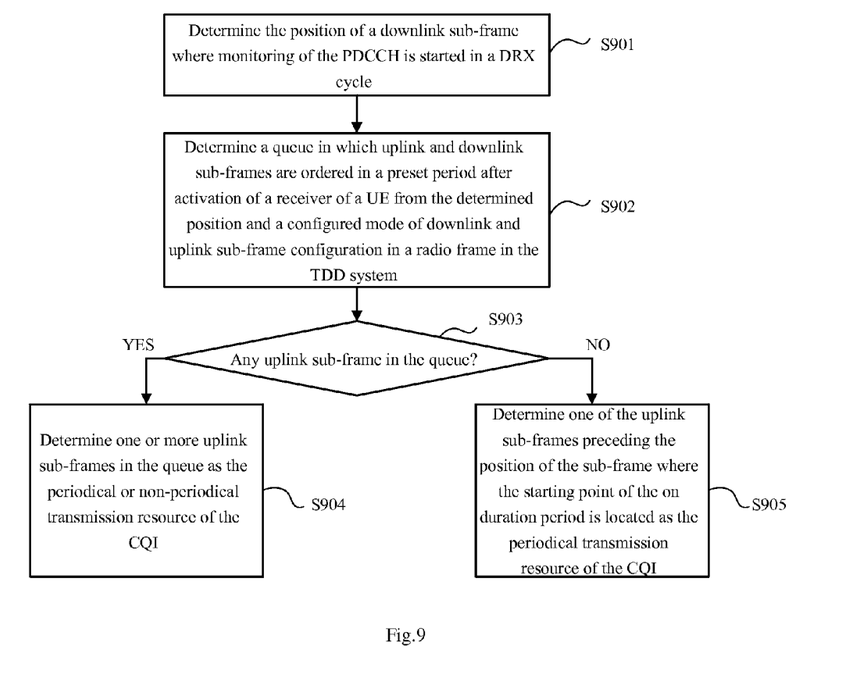
FIG. 9 is a flow chart of a method for determining a transmission resource of a CQI according to a second embodiment of the invention.

Reference is made to FIG. 9 illustrating a method for determining a transmission resource of a CQI according to the second embodiment of the invention, which includes the following operations S901-S905.

at operation S901, a position of a downlink sub-frame where the monitoring of the PDCCH is started in a DRX cycle is determined;

at operation S902, a queue in which uplink and downlink sub-frames are ordered in a preset period after activation of a receiver of a UE is determined from the determined position and a configured mode of downlink and uplink sub-frame configuration in a radio frame in a TDD system;

at operation S903, it is determined whether there is an uplink sub-frame in the determined queue, and if so, then operation S904 is performed; otherwise, operation S905 is performed;

at operation S904, one or more uplink sub-frames in the queue are determined as a transmission resource for the periodical or non-periodical transmission of a CQI; and at operation S905, one of the uplink sub-frames preceding the position of the sub-frame where the monitoring of the PDCCH is started is determined as the periodical transmission resource of the CQI.

Figure 10:
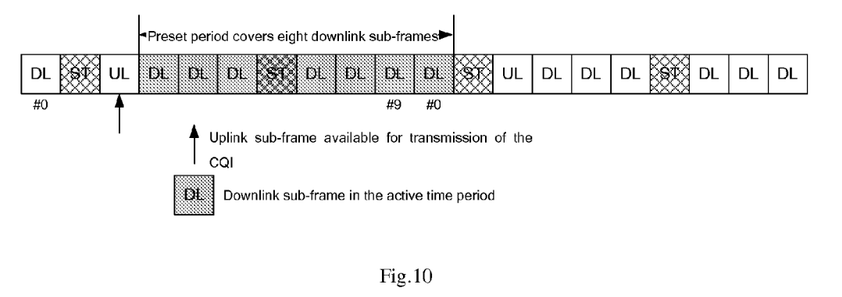
FIG. 10 is a schematic diagram of transmission of a CQI with configuring an uplink resource preceding a starting point of monitoring a PDCCH according to the embodiment of the invention.

A specific instance is as illustrated in FIG. 10, where a TDD system is in a configuration mode of 8DL:1UL, and if the starting point of monitoring the PDCCH is the downlink sub-frame #3 assuming the preset period covers eight downlink sub-frames, then starting from the position of the sub-frame where the starting point of monitoring the PDCCH is located, it is determined from the order in which uplink and downlink sub-frames are arranged in the configuration mode of 8DL:1UL and the length of the preset period that a queue in which uplink and downlink sub-frames are ordered in the preset period after activation of the UE includes all of the DL sub-frames between the two long and black lines in FIG. 10. That is, the queue includes no uplink sub-frame, so there is no chance to transmit any CQI in the preset period. In this case, a CQI transmission resource shall be configured in an uplink sub-frame preceding the starting point of monitoring the PDCCH in order to ensure the uplink transmission of the CQI.

In a specific application, if there are a plurality of uplink sub-frames preceding the position of the sub-frame where the starting point of monitoring the PDCCH is located, then in view of a transmission delay of reporting the CQI and a processing delay of the received CQI report at the network side, and assuming that the transmission delay plus the processing delay is equal to T, one of the consecutive uplink sub-frames leading in the period of T preceding the position of the sub-frame where the starting point is located is determined as the periodical transmission resource of the CQI. For example, if the number of consecutive uplink sub-frames is equal to ten, with T=3 ms (i.e., a delay of three sub-frames), then it is sufficient to transmit the CQI in the third uplink sub-frame preceding the position of the sub-frame where the starting point of monitoring the PDCCH is located, in order to both ensure a sufficient period for receiving and processing the CQI at the network side and make the reported CQI reflect more truly the current channel quality of the downlink channel.

With the methods according to the first and second embodiments, the UE can be notified of the transmission resource of the CQI (including the determined uplink UL sub-frame for transmission of the CQI and also information of specific time, frequency, code resource, etc., specified for transmission of the CQI) determined at the network side over the PDCCH and transmit the CQI report over the transmission resource. Specific notification and report modes are known in the prior art and is not detailed here.

In order to further improve the methods according to the first and second embodiments, in a specific application, if the UE is so active in term of its service that its receiver remains activated for a longer period after activation, then a non-periodical transmission resource of the CQI can be allocated temporarily for the UE according to the length of the period in which the receiver of the UE remains activated (i.e., the active time period). A specific implementation solution is as follows.

The length of the period in which the receiver of the UE remains activated is counted, and when the length of the period in which the receiver of the UE remains activated exceeds a preset period length threshold, one or more uplink sub-frames in the next radio frame are determined as the non-periodical transmission resource of the CQI.

For example, the length of the period in which the receiver of the UE keeps activated is accumulated, and each time the length of the period is incremented by 5 ms (for example, the preset period length thresholds is 5 ms, 10 ms, . . . ), the UE is instructed to transmit the CQI in one or more succeeding uplink sub-frames.

Preferably, the solution further includes: determining whether the period in which the receiver of the UE keeps activated ends; and if so, then instructing the UE not to transmit any further CQI report.

With the foregoing further improved solution, dynamic configuration of the CQI transmission resource can be achieved, and after the UE enters the inactivity status at the end of the active time period, no further CQI is transmitted, thereby further saving effectively the uplink resource.

The methods for determining a transmission resource of a CQI according to the embodiments of the invention have been detailed above taking the TDD system as an example. Since the HD-FDD system is similar to the TDD system in that only uplink or downlink transmission is performed at a time, except for different frequencies at which uplink and downlink transmission is performed respectively, the method according to the embodiments of the invention can also be applicable to the HD-FDD system.

A Third Embodiment

Figure 11:
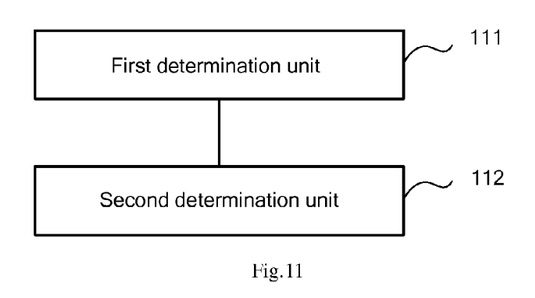
FIG. 11 is a schematic diagram of the structure of a device for determining a transmission resource of a CQI according to an embodiment of the invention.

Based upon the methods for determining a transmission resource of a CQI according to the embodiments of the invention, an embodiment of the invention provides a corresponding device for determining a transmission resource of a CQI with a structure as illustrated in the schematic diagram of FIG. 11, which includes:

a first determination unit 111 configured to determine a position of a downlink sub-frame where monitoring of the PDCCH is started in a DRX cycle; and a second determination unit 112 configured to determine a transmission resource of a CQI as one uplink sub-frame preceding the determined position or one or more uplink sub-frames following the determined position.

Figure 12:
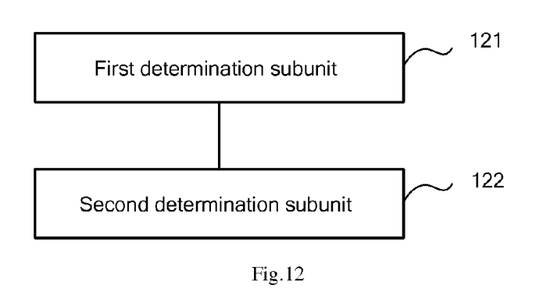
FIG. 12 is a schematic diagram of the specific structure of a second determination unit in the device for determining a transmission resource of a CQI according to the embodiment of the invention.

Preferably, a first structure of the second determination unit 112 as illustrated in the schematic diagram of FIG. 12 includes:

a first determination subunit 121 configured to determine a queue in which uplink and downlink sub-frames are arranged in a preset period after activation of a receiver of a UE according to the position determined by the first determination unit 111 and a configured mode of downlink and uplink sub-frame configuration in a radio frame in the system; and a second determination subunit 122 configured to determine the transmission resource of the CQI based upon the queue determined by the first determination subunit 121.

Figure 13:
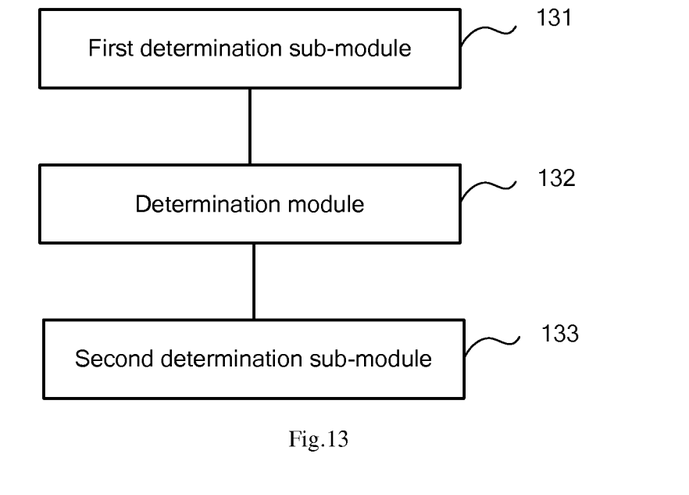
FIG. 13 is a schematic diagram of the specific structure of a second determination subunit of the second determination unit in the device for determining a transmission resource of a CQI according to the embodiment of the invention.

Preferably, a structure of the second determination unit 112 as illustrated in the schematic diagram of FIG. 13 includes:

a first determination sub-module 131 configured to determine one or more of the uplink sub-frames in the queue determined by the first determination subunit 121 as the transmission resource for the periodical or non-periodical transmission of the CQI.

Preferably, the second determination subunit 122 further includes a determination module 132 and a second determination sub-module 133;

The determination module 132 is configured to determine whether the queue determined by the first determination subunit 121 includes an uplink sub-frame; and if so, then to start the first determination sub-module 131; otherwise, to start the second determination sub-module 133;

The second determination sub-module 133 is configured to acquire the position determined by the first determination unit 111 and to determine one of the uplink sub-frames preceding the position as the periodical transmission resource of the CQI.

Preferably, upon determining that the queue determined by the first determination subunit 121 includes more than one consecutive uplink sub-frame, the determination module 132 is further configured to notify, according to a transmission delay of reporting the CQI plus a processing delay of the received CQI report of T, the first determination sub-module 131 of one of the consecutive uplink sub-frames in the queue leading in the period of T preceding the position of the next downlink sub-frame;

The first determination sub-module 131 determines the uplink sub-frame notified from the determination module 133 as the transmission resource for the periodical or non-periodical transmission of the CQI.

Preferably, upon determining that the queue determined by the first determination subunit 121 includes no uplink sub-frame and there are a plurality of consecutive uplink sub-frames preceding the position determined by the first determination unit 111, the determination module 132 is further configured to select and notify, according to a transmission delay of reporting the CQI plus a processing delay of the received CQI report of T, one of the consecutive uplink sub-frames leading in the period of T preceding the position to the second determination sub-module 133;

The second determination sub-module 133 determines the uplink sub-frame notified from the determination module 132 as the periodical transmission resource of the CQI.

Preferably, the determination module 132 is further configured to determine whether the number of downlink sub-frames arranged consecutively preceding one of the uplink sub-frames leading in the queue determined by the first determination subunit 121 reaches a preset threshold, and if so, then to start the second determination sub-module 133.

Figure 14:
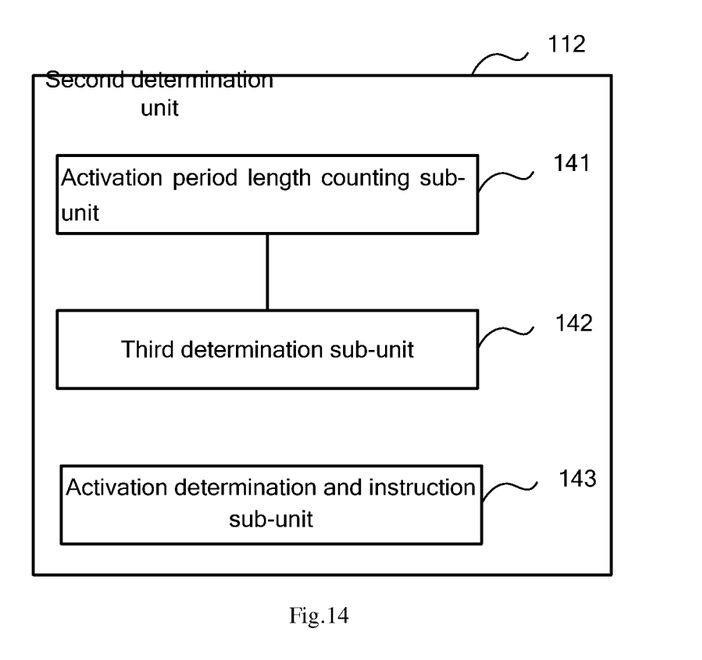
FIG. 14 is another schematic diagram of the specific structure of the second determination unit in the device for determining a transmission resource of a CQI according to the embodiment of the invention.

Preferably, a second structure of the second determination unit 112 as illustrated in the schematic diagram of FIG. 14 includes an activation period length counting subunit 141 and a third determination subunit 142;

The activation period length counting subunit 141 is configured to count the length of a period in which the receiver of the UE keeps activated and to start the third determination subunit 142 when the length of the period in which the receiver of the UE keeps activated exceeds a preset period length threshold;

The third determination subunit 142 is configured to determine one or more of the uplink sub-frames following the threshold as the non-periodical transmission of the CQI.

Preferably, the second determination unit 112 further includes an activation determination and instruction subunit 143 configured to determine whether the period in which the receiver of the UE keeps activated ends, and if so, then to instruct the UE not to transmit any further CQI report.

In summary, the embodiments of the invention provide a solution of configuring dynamically a transmission resource of a CQI in comprehensive consideration of proportional configuration of TDD uplink and downlink sub-frames, the starting point of a DRX cycle and setting of DRX related timers for a TDD system, which can ensure acquisition of corresponding CQI information in downlink scheduling while avoiding an unnecessary waste of a resource. The solution according to the embodiments of the invention can also be applicable to an HD-FDD system.

Evidently, those skilled in the art can make various modifications and variations to the invention without departing from the scope of the invention. Thus, the invention is also intended to encompass these modifications and variations provided that these modifications and variations come into the scope of the appended claims and their equivalents.

The invention claimed is:

1. A method for determining a transmission resource of a Channel Quality Indicator, CQI, applicable to a Time Division Duplex system and a Half Division-Frequency Division Duplex system using a Discontinuous Reception operation, comprising:
   determining a position of a downlink sub-frame where monitoring of a Physical layer Downlink Control Channel is started in a Discontinuous Reception cycle; and
   determining a transmission resource of a CQI as one uplink sub-frame preceding the determined position or one or more uplink sub-frames following the determined position;
   wherein the determining the transmission resource of the CQI comprises:
   determining a queue in which uplink and downlink sub-frames are arranged in a predefined period after activation of a receiver of a User Equipment (UE) according to the determined position and a configured mode of downlink and uplink sub-frame configuration in a radio frame of the system; and
   determining the transmission resource of the CQI based upon the queue;
   and wherein the determining the transmission resource of the CQI based upon the queue comprises:
   determining whether the queue comprises an uplink sub-frame; and
   if so, then determining one or more of the uplink sub-frames in the queue as a transmission resource for the periodical or non-periodical transmission of the CQI;
   otherwise, determining one of uplink sub-frames preceding the determined position as the transmission resource for the periodical transmission of the CQI.

2. The method of claim 1, wherein, upon determining that the queue comprises no uplink sub-frame and there are a plurality of consecutive uplink sub-frames preceding the determined position, then according to a transmission delay of reporting the CQI plus a delay due to the processing of the received CQI report of T, one of the consecutive uplink sub-frames leading in the period of T preceding the determined position is selected and determined as the transmission resource for the periodical transmission of the CQI.

3. The method of claim 1, wherein, upon determining that the queue comprises more than one consecutive uplink sub-frame, then according to a transmission delay of reporting the CQI plus a delay due to the processing of the received CQI report of T, one of the consecutive uplink sub-frames in the queue leading in the period of T preceding the next downlink sub-frame is selected and determined as the transmission resource for the periodical or non-periodical transmission of the CQI.

4. The method of claim 1, wherein, if the number of downlink sub-frames arranged consecutively preceding one of the uplink sub-frames leading in the queue reaches a predefined threshold, then one of the uplink sub-frames preceding the determined position is also determined as the transmission resource for the periodical transmission of the CQI.

5. The method of claim 1, wherein, the number of downlink sub-frames included in the predefined period is determined from the number of downlink sub-frames where the PDCCH is monitored continuously in a start phase of a Discontinuous Reception cycle predefined by a Node B and a cycle of repeating arranged sub-frames corresponding to the configured mode of downlink and uplink sub-frame configuration in a radio frame of the Time Division Duplex system.

6. The method of claim 1, further comprising counting the length of a period in which a receiver of a UE remains active, and
   when the length of the period in which the receiver of the UE remains active exceeds a predefined period length threshold, determining one or more of the uplink sub-frames following the threshold as a transmission resource for non-periodical transmission of the CQI.

7. The method of claim 3, further comprising determining whether the active time of the receiver of the UE expires, and
   instructing the UE not to transmit any further CQI report upon determining that the active time of the receiver of the UE expires.

8. A device for determining a transmission resource of a Channel Quality Indicator, CQI, applicable to a Time Division Duplex system and a Half Division-Frequency Division Duplex system using a Discontinuous Reception operation, comprising:
   a first determination unit configured to determine a position of a downlink sub-frame where monitoring of a Physical layer Downlink Control Channel is started in a Discontinuous Reception cycle; and
   a second determination unit configured to determine a transmission resource of a CQI as one uplink sub-frame preceding the determined position or one or more uplink sub-frames following the determined position;
   wherein the second determination unit comprises:
   a first determination subunit configured to determine a queue in which uplink and downlink sub-frames are arranged in a predefined period after activation of a receiver of a User Equipment, UE, according to the position determined by the first determination unit and a configured mode of downlink and uplink sub-frame configuration in a radio frame of the system; and
   a second determination subunit configured to determine the transmission resource of the CQI based upon the queue determined by the first determination subunit;
   and wherein the second determination subunit comprises:
   a first determination sub-module configured to determine one or more of the uplink sub-frames in the queue determined by the first determination subunit as a transmission resource for the periodical or non-periodical transmission of the CQI;
   a determination module configured to determine whether the queue determined by the first determination subunit comprises an uplink sub-frame; and if so, then to start the first determination sub-module; otherwise, to start a second determination sub-module; and
   the second determination sub-module configured to acquire the position determined by the first determination unit and to determine one of uplink sub-frames preceding the position as the transmission resource for the periodical transmission of the CQI.

9. The device of claim 8, wherein, upon determining that the queue determined by the first determination subunit comprises more than one consecutive uplink sub-frame, the determination module is further configured to notify, according to a transmission delay of reporting the CQI plus a delay due to the processing of the received CQI report of T, the first determination sub-module of one of the consecutive uplink sub-frames in the queue leading in the period of T preceding the position of the next downlink sub-frame; and
   the first determination sub-module determines the uplink sub-frame notified from the determination module as the transmission resource for the periodical or non-periodical transmission of the CQI.

10. The device of claim 8, wherein, upon determining that the queue determined by the first determination subunit comprises no uplink sub-frame and there are a plurality of consecutive uplink sub-frames preceding the position determined by the first determination unit, the determination module is further configured to select and notify, according to a transmission delay of reporting the CQI plus a delay due to the processing of the received CQI report of T, one of the consecutive uplink sub-frames leading in the period of T preceding the position to the second determination sub-module; and     the second determination sub-module determines the uplink sub-frame notified from the determination module as the transmission resource for the periodical transmission of the CQI.

11. The device of claim 8, wherein, the determination module is further configured to determine whether the number of downlink sub-frames arranged consecutively preceding one of the uplink sub-frames leading in the queue determined by the first determination subunit reaches a predefined threshold, and if so, then to start the second determination sub-module.

12. The device of claim 8, wherein, the second determination unit comprises an activation period length counting subunit and a third determination subunit;

the activation period length counting subunit is configured to count the length of a period in which a receiver of a User Equipment remains active and to start the third determination subunit when the length of the period in which the receiver of the UE remains active exceeds a preset period length threshold; and     the third determination subunit is configured to determine one or more of the uplink sub-frames following the threshold as the transmission resource for the non-periodical transmission of the CQI.

13. The device of claim 12, wherein, the second determination unit further comprises an activation determination and instruction subunit configured to determine whether in the active time of the receiver of the UE expires, and if so, then to instruct the UE not to transmit any further CQI report.

\* \* \* \* \*